UNITED STATES PATENT OFFICE 2,342,887

PROCESS FOR THE PREPARATION OF BIVALENT METAL DERIVATIVES OF WEAKLY ACIDIC ORGANIC COMPOUNDS

Joseph F. Nelson, Elizabeth, N. J., assignor to Standard Oil Development Company, a corporation of Delaware No Drawing. Application November 2, 1940, Serial No. 364,033

6 Claims. (Cl. 260—609)

This invention relates to an improved process for preparing metal derivatives of weakly acidic organic compounds, which is especially advantageous for the preparation of organic derivatives of divalent metals which are effective oxidation inhibitors and improving agents for hydrocarbon lubricating oils.

The invention relates more particularly to the production of metal aroxides by reacting a metal alkoxide with a phenol under such conditions that a metal aroxide is formed with liberation of an alcohol corresponding to the alkoxy radical. This process is especially advantageous for the preparation of magnesium derivatives of substituted phenols such as alkyl phenols and alkyl hydroxy aryl sulfides.

It is known that aqueous solutions of alkali metal aroxides may be generally prepared by reaction of the phenol with an alkali metal base, such as sodium hydroxide, in the presence of water. When this reaction is attempted with weak bases of the polyvalent metals, very low yields, if any, of the desired products are obtained and further difficulties are encountered in the necessity of rendering the metal aroxides anhydrous and of sufficient purity for use. These disadvantages are especially pronounced with the more weakly acidic phenolic derivatives, such as the alkyl phenols, the alkyl phenol sulfides and the like, while the metal derivatives of such alkyl phenols are greatly preferred for use as lubricating oil addition agents, being of far greater solubility in petroleum lubricating oils than the metal derivatives of unsubstituted phenols. The metal alkyl aroxides preferred for use in lubricating oils contain at least 10 carbon atoms in alkyl groups per molecule.

It has now been found that high yields of metal aroxides even of such alkyl phenols may be obtained and these disadvantages avoided by an improved process involving the reaction of a metal alkoxide of the desired metal and a low molecular weight alcohol with the phenol under such conditions that the low molecular weight alcohol corresponding to the alkoxy radical is set free. This reaction may be conducted in a diluent medium while boiling under reflux in order to remove the alcohol formed in the reaction.

The following examples are presented to illustrate suitable methods for carrying out the process of this invention.

Example 1

6 grams (4.1 grams=⅙ mol) of metallic magnesium were reacted with 150 cc. of anhydrous ethyl alcohol by heating, the alcohol being used in excess. A small amount of mercury chloride $HgCl_2$ and iodine were added as catalysts. The mixture was refluxed for 24 hours. 60 grams (⅙ mol) of tertiary amyl hydroxy phenyl sulfide dissolved in 150 cc. of absolute ethyl alcohol were added and the whole mixture was refluxed for 24 hours and then filtered hot. The filtrate was stripped free of solvent, and a 40-gram yield of a yellow solid was obtained. This product was a magnesium salt of tertiary amyl hydroxy phenyl sulfide and was oil-soluble. Upon analysis it was found to contain 13.48% of magnesium oxide MgO.

The calculated magnesium oxide content of the mono-magnesium salt is 10.61%, hence the product obtained was a mixture of the mono- and di-salts having the following formulae:

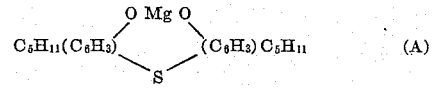

(A)

and

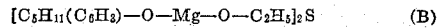

(B)

By continued heating in the presence of an excess of magnesium ethoxide, the magnesium content of the product may be varied until all the product possesses the formula B.

Example 2

A large batch (about 250 lbs.) of magnesium tertiary amyl hydroxy phenyl sulfide was prepared. The magnesium was dissolved in anhydrous methyl alcohol to form magnesium methoxide, using a large excess of methyl alcohol as solvent. The magnesium was completely reacted with the methyl alcohol in one to two hours, no catalyst being required for this reaction. A solution (about 33% concentration) of tertiary amyl hydroxy phenyl sulfide in methyl alcohol was added to the solution of magnesium methoxide. A substantial proportion of the resultant magnesium salt of tertiary amyl hydroxy phenyl sulfide formed rapidly and precipitated, but some remained in solution. The entire batch was therefore evaporated to dryness and the residue of the magnesium salt was then dissolved directly in a lubricating oil base stock. In this case a 10% stock solution was made in a naphthenic oil having a viscosity of about 55 secs. Saybolt at 210° F., the solution was filtered to remove a very small amount of magnesium oxide (apparently formed as an impurity), and then the purified stock solution was diluted down to the 1% concentration with the lubricating oil base stock in which it was to be used. In order to test the uniformity of this magnesium salt, a large number of samples were taken and upon analysis it was found that all of these samples contained between 10.0 and 11.0% of magnesium oxide, thereby indicating a very satisfactory uniformity. The entire batch averaged 10.6% MgO, which is substantially identical with the theoretical amount of 10.61% based on the formula $$Mg(-O-C_6H_3-C_5H_{11})_2S$$

*Example 3*

The method described in Example 2 for the preparation of the magnesium salt of tertiary amyl hydroxy phenyl sulfide was repeated substantially identically except that instead of using tertiary amyl hydroxy phenyl sulfide as one of the raw materials, the corresponding diisobutyl hydroxy phenyl sulfide (bis-tetramethyl butyl hydroxy phenyl sulfide) was used, being added to the magnesium methoxide in the form of a methyl alcohol solution thereof. The resulting product formed was the magnesium salt of diisobutyl hydroxy phenyl sulfide which probably has the formula:

$$Mg(-O-C_6H_3-C_8H_{17})_2S$$

This product was found upon analysis to contain 8.23% MgO (theoretical 8.33) and is readily soluble in mineral lubricating oils.

Corresponding magnesium salts of other alkyl hydroxy aryl sulfides may be prepared, for instance, by substituting polysulfides, such as alkyl hydroxy phenyl disulfides, or polymers, such as the dimers, trimers and tetramers of the alkyl hydroxy aryl thioethers, disulfides and the like, in place of the thioethers used in the above examples. Also the corresponding magnesium salts of the corresponding selenides and tellurides may be prepared.

The reactions described in the above examples to prepare the metal derivatives of weakly acidic compounds may also be conducted in other solvents and diluents which are substantially inert under the conditions of the reaction, such as hydrocarbon oils, petroleum ether, hexane, naphtha, and even heavier oils which may serve as solvents or merely as liquid vehicles to aid the mixing of the reagents and the removal of the low molecular weight alcohol set free in the reaction. This may be aided by heating the reaction mixture to cause distillation of the liquid vehicle, or a stripping gas or vapor may be passed through the reaction mixture to vaporize the alcohol produced.

The various products obtained may be purified, if desired, by fractional crystallization, extraction, precipitation with selective solvents and the like. Also impurities may be removed by treatment with suitable adsorptive agents, such as clay.

The present invention may also be used generally to prepare divalent metal derivatives of organic compounds having weakly acidic hydroxyl groups. Suitable reagents are indicated in the following equation, $$M(OR)_n + nR'OH \rightarrow M(OR')_n + nROH$$

in which M represents a divalent metal, especially a metal of group II such as magnesium, zinc, cadmium, beryllium, calcium, strontium, and barium; R represents an alkyl radical having less than about 5 carbon atoms, R' represents an organic radical of at least 6 carbon atoms and having a carbon atom linked to O and also linked only to carbon and hydrogen, and n is a number from 1 up to that sufficient to satisfy valence requirements. The above equation illustrates the application of this process to the preparation of metal derivatives of the monohydroxy compounds such as the alkyl phenols. The invention may also be used similarly to prepare metal derivatives of the polyhydroxy and like compounds such as the hydroxy phenyl sulfides, such derivatives being represented by the following formula:

$$(MO_2)_yR'_x$$

in which M represents a divalent metal as defined above, R' represents a polyvalent organic radical (preferably divalent) of at least 6 carbon atoms and having each free valence satisfied by one of the oxygen atoms, $x$ is a numeral 1 when the valency of R' is even and 2 when the valency of R' is odd, and $y$ is a small whole number sufficient to satisfy the valence requirements of $R'_x$. Mixed products may, of course, be prepared by using a mixture of two or more alkoxides of different metals, and/or a mixture of two or more weakly acidic organic compounds.

Many of the metals mentioned above, such as calcium and barium, are not readily available in pure form, hence it is preferable to prepare their alkoxides by double composition, instead of by the direct reaction of the metal with a lower alcohol, as illustrated above in the preparation of magnesium alkoxides. Sodium methoxide is readily available and can be converted by double decomposition with a salt of calcium or barium to give the desired metal alkoxide. For example, this reaction can be carried out with anhydrous calcium chloride in alcohol solution, the resulting sodium chloride being insoluble therein and being readily separated from the alcohol solution of calcium methoxide, which may be used as a reagent in the process illustrated above in place of the magnesium alkoxides.

The present invention may thus be used to prepare metal derivatives from organic compounds generally which contain at least 6 carbon atoms and which also contain a weakly acidic hydroxyl group, including especially the higher alcohols, phenols, phenol sulfides, mercaptans and isomers thereof having enolic hydroxyl groups. Such organic compounds should also have a higher boiling point under the reaction conditions than the alcohol corresponding to the alkoxide reagent, in order to permit removal of this alcohol by distillation. This invention is particularly useful in the preparation of metal salts from materials too weakly acidic to enter into normal reactions. It may even be employed for preparing the salts of higher fatty alcohols corresponding to the acids of natural fats and oils, although such higher alcohols do not react readily even with metallic sodium. It is also useful for preparation of metal aroxides from phenols and both cyclic and aliphatic derivatives thereof, such as cyclohexyl phenol and other cyclo alkyl and naphthyl phenols, phenyl phenol and other aryl phenols, phenolic compounds having condensed nuclei such as naphthol and the like, alkylated phenolic compounds such as cresols and higher alkylated derivatives containing one or more alkyl groups of two or more carbon atoms each attached to the aromatic nucleus. Other derivatives of all such phenolic compounds may also be used in which other substituent groups may be attached to the aromatic nucleus such as chlorine and other halogens, also amino groups, particularly hydrocarbon substituted amino groups such as dimethyl amino and the like, also oxygen, sulfur, selenium or tellurium. The process is also applicable to the preparation of metal derivatives from the thioethers and disulfides of the above described phenolic compounds and derivatives thereof. Particularly suitable examples thereof are the alkyl hydroxy aryl sulfides (thioethers, disulfides, etc.) having an alkyl group of at least 4 and preferably less than about 13 carbon atoms attached to the aryl ring, such as tertiary butyl hydroxy phenyl thioether, secondary amyl hydroxy phenyl disulfide, isooctyl hydroxy phenyl sulfide, and the like. The alkyl and polyalkyl phenols may be synthesized conveniently by alkylating a phenol with one or more olefins, especially the branched chain olefin polymers such as diisobutylene, triisobutylene, ditertiary-amylene or with other suitable agents such as isobutylene, trimethyl ethylene, cyclohexene, hexene-2, alcohols, alkyl sulfates, alkyl phosphates or alkyl halides, thereby forming carbon to carbon bonds between the aromatic nucleus and the alkyl group.

Phenolic compounds obtained from petroleum are also useful for the present process and are considered to contain polymethylene or cycloalkyl side chains as evidenced by their hydrogen and carbon analysis. The petroleum phenolates may be obtained by extraction of various stocks, chiefly heating oil stocks obtained by cracking of heavier oils, with caustic soda and acidification of the alkaline extract with a weak mineral acid followed by a non-destructive distillation, if desired, of the organic products. By using the above described methods or other suitable methods for preparing alkyl phenols, the following alkylated phenols, especially suitable for use in the process of this invention, may be obtained; tertiary amyl phenols, isohexyl phenol, diisobutyl phenol, ditertiary butyl phenol, tetramethyl-butyl (octyl) phenol, etc.

The inorganic derivatives of the phenols indicated above to be suitable for use in the present invention, may be produced by various methods. Inorganic substituents may be introduced into the alkyl phenols, for example, an alkyl phenol such as tertiary amyl phenol may be reacted with sulphur monochloride, $S_2Cl_2$, in about a 2/1 molar ratio and preferably in a solvent such as dichlorethane, to produce the alkyl hydroxy phenyl disulfide. Using substantially the same procedure but substituting sulfur dichloride, $SCl_2$, for the monochloride, the tertiary amyl hydroxy phenyl thioether is obtained. Suitable processes for conducting this reaction are described in U. S. Patent 2,139,321. Alkyl chlor phenols are obtained by chlorination preferably controlled to replace nuclear hydrogen by chlorine. This may be accomplished by chlorinating the phenol before alkylation. In such a manner, for example, 2-chlor-4-tertiary amyl phenol can be obtained. Nitro substituents are introduced readily into the aromatic nucleus by direct nitration and the nitro substituents may be reduced to amino groups. It is to be understood, however, that the preparation of substituted phenolic compounds which have been described above does not form part of this invention and that any of the well known methods for their production may be used, all such compounds forming suitable materials for the preparation of metal phenolates by the process of this invention.

The preparation of metal aroxides of compounds which contain loosely bound sulfur is usually accompanied by the loss of some of this sulfur during the reaction, this being especially characteristic of the phenyl disulfides and higher polysulfides, such as the alkyl hydroxy aryl disulfides described above. This difficulty is substantially avoided in the present process, practically all the sulfur remaining in the molecule in the resulting metal aroxide salt thereof. For example, in the preparation of the barium salt of tertiary amyl hydroxy phenyl disulfide, up to about 50% of the theoretical amount of barium required for complete reaction may be introduced by reaction of this compound with barium hydroxide, and the remaining amount of barium up to the theoretical may then be introduced by the reaction of the first product with barium methoxide, as described above. Also, mixed products containing two or more metals may be prepared by using an alkoxide of a different metal, such as magnesium methoxide, in the second reaction.

I claim:

1. Process for preparing a magnesium derivative of an alkyl hydroxy phenyl sulfide comprising heating under reflux a solution in a low molecular weight aliphatic alcohol of a magnesium alkoxide in which the alkyl group has less than 5 carbon atoms with an alkyl hydroxyl phenyl sulfide.

2. Process for preparing a magnesium derivative of tertiary amyl hydroxy phenyl sulfide which comprises heating under reflux a solution in anhydrous ethyl alcohol of magnesium ethylate with tertiary amyl hydroxy phenyl sulfide.

3. Process for preparing a metal salt of a phenol sulfide which comprises reacting a metal compound of the formula $$M(OR)_2$$

where M is a member of the class consisting of alkaline earth metals and magnesium and R is an alkyl group having less than five carbon atoms, with a phenol sulfide.

4. Process according to claim 3 in which the reaction is conducted in the presence of a low molecular weight aliphatic alcohol as a solvent.

5. Process for preparing a magnesium salt of an alkyl phenol sulfide which comprises reacting a magnesium alcoholate containing less than five carbon atoms with an alkyl phenol sulfide.

6. Process according to claim 5 in which the reaction is conducted by heating the reactants under reflux in the presence of an anhydrous low molecular weight aliphatic alcohol.

JOSEPH F. NELSON.